United States Patent [19]

Kawamura

[11] Patent Number: 5,651,248

[45] Date of Patent: Jul. 29, 1997

[54] DIESEL PARTICULATE FILTER APPARATUS

[75] Inventor: Hideo Kawamura, Samukawa-machi, Japan

[73] Assignee: Isuzu Ceramics Research Institute Co., Ltd., Kanagawa-Ken, Japan

[21] Appl. No.: 519,980

[22] Filed: Aug. 28, 1995

[30] Foreign Application Priority Data

Aug. 29, 1994 [JP] Japan .................................. 6-226109
Aug. 29, 1994 [JP] Japan .................................. 6-226110

[51] Int. Cl.$^6$ .................................................. F01N 3/02
[52] U.S. Cl. ........................ 60/286; 55/283; 55/466; 55/DIG. 30; 60/277; 60/288; 60/311
[58] Field of Search ........................... 60/286, 288, 311, 60/277; 55/283, 466, DIG. 30

[56] References Cited

U.S. PATENT DOCUMENTS

| | | | |
|---|---|---|---|
| 3,910,040 | 10/1975 | Garcea | 60/288 |
| 4,264,344 | 4/1981 | Ludecke et al. | |
| 4,503,672 | 3/1985 | Stark et al. | |
| 4,538,411 | 9/1985 | Wade | 60/286 |
| 4,665,689 | 5/1987 | Rognon | 60/311 |

FOREIGN PATENT DOCUMENTS

| | | |
|---|---|---|
| 0 367 587 A2 | 11/1989 | European Pat. Off. |
| 2-256812 | 10/1990 | Japan. |
| 6-33737 | 2/1994 | Japan. |
| 6-129233 | 5/1994 | Japan. |
| 6-173639 | 6/1994 | Japan. |
| WO 85/02882 | 7/1985 | WIPO. |

Primary Examiner—Douglas Hart
Attorney, Agent, or Firm—Browdy and Neimark

[57] ABSTRACT

This DPF apparatus has the main filter and the sub-filter installed in the exhaust gas passage, with an open-close valve provided to the main filter and a bypass valve provided to the sub-filter. A particulate accumulation sensor is also installed in the exhaust gas passage on the inlet side of the main filter. In response to the detection signals from the particulate accumulation sensor and the temperature sensor, the controller operates the open-close valve and the bypass valve and applies electricity to the metal net forming heaters to incinerate collected particulates. The particulate accumulation sensor comprises a detection filter whose ventilation resistance per unit volume is almost equal to that of the filter body, terminals made of a conductive metal and attached to the ends of the detection filter, and a resistance sensor to measure resistance between the terminals.

13 Claims, 4 Drawing Sheets

DIESEL PARTICULATE FILTER APPARATUS

BACKGROUND OF THE INVENTION

1. Field of the Invention

This invention relates to a diesel particulate filter apparatus adapted to collect by a filter an exhaust gas discharged from a diesel engine, and incinerating the same.

2. Description of the Prior Art

The combustion in a diesel engine is based on the heterogeneous mixing carried out by injecting a fuel into high-temperature and high-pressure air. In the heterogeneous mixing, air and a fuel are not uniformly mixed unlike those in a homogeneous gaseous mixture. Therefore, the carbon component in the fuel turns into soot and HC due to the high combustion heat, and they are agglomerated into particulates, which are discharged to the outside to cause the contamination of the environment. A conventional diesel particulate filter using a porous filter, one of exhaust emission control equipment that treat exhaust gases from engines, has a large area to collect particulates. To incinerate the particulates accumulated on the filter, the particulate filter is provided on its surface with a heater, which, when the amount of accumulated particulates exceeds a predetermined reference, is applied an electric current to incinerate particulates, thereby regenerating the filter.

Japanese Patent Laid-Open No. 256812/1990 discloses a particulate trap which can be electrically regenerated. This particulate trap comprises a gas permeable support, a plurality of fiber layers of ceramic fiber, and a heater, and the fiber layers and heater are provided in a space extending radially from the gas permeable support. An exhaust gas is introduced into clearances between the fiber layers, and the particulates in the exhaust gas are collected in a position near the heater, the collected particulates being incinerated by supplying an electric current to the heater. The material for the ceramic fibers is selected from continuous molten silica, glass, alumina silica, zirconia silica, alumina chromia, titania, graphite, silicon carbide and alumina boria silica. The ceramic fiber is directly braided on or wound around the surface of the gas permeable support or heater.

It is necessary that the diesel particulate filter be made compact so that it can be mounted on a vehicle conveniently and collect particulates, such as carbon, soot and HC efficiently. The particulates easily burn by reacting with oxygen but require high temperatures for combustion, and hence they cannot completely burn only with the exhaust gas heat. A conventional diesel particulate filter apparatus is provided with two filters of the same size arranged in parallel with a flow of an exhaust gas. When one filter is clogged with collected particulates, the exhaust gas is supplied to the other filter, while the air required for the incineration of particulates is sent to the clogged filter so as to heat the filter and incinerate the collected particulates, whereby the filter is regenerated.

Figure 7:
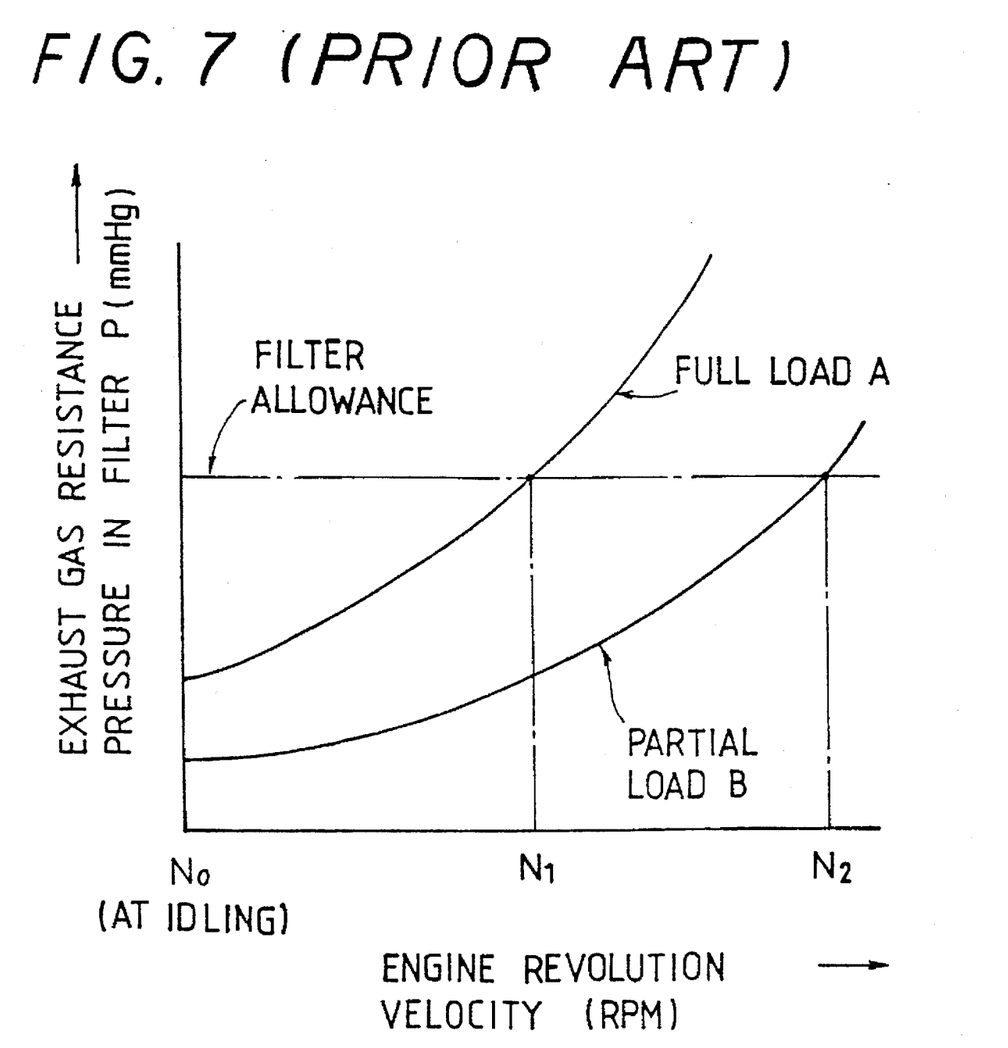
FIG. 7 is a graph showing the relation between the exhaust gas pressure on the filter and the engine revolutions and load.

When the amount of particulates collected by the filter exceeds a predetermined amount, the heater is turned on for heating. It is, however, very difficult to precisely detect the amount of particulates accumulated on the filter. The conventional method, for example, measures the amount of accumulated particulates indirectly by measuring the exhaust gas pressure with a pressure sensor installed in the exhaust gas flow upstream of the filter. The exhaust gas pressure and flow, however, vary depending on the load and revolution of the engine, making it difficult to detect the precise amount of particulates. The filter's exhaust gas resistance pressure assumes different values for a full load and a part load, as indicated by A and B in FIG. 7. The allowable value of the filter's exhaust gas resistance pressure P when the engine revolution is high at $N_2$ is different from the resistance value of the exhaust gas resistance pressure P when the revolution is low at $N_1$. In FIG. 7, the revolution $N_0$ represents the engine revolution at idling. Even in the state of A where the filter is clogged and no longer suited for service, the filter continues to be used without being regenerated. If, after this, the engine is suddenly applied a high load, the exhaust gas resistance pressure increases sharply exceeding the allowable value, with the result that the filter cannot withstand the high exhaust gas resistance pressure.

The ability to detect, as the absolute value, the amount of particulates accumulated on the filter such as carbon, soot and HC ensures the most reliable control of the regeneration timing for the filter and is also required to improve the durability of the filter. Therefore, it has been the task to establish the way to detect the amount of particulates accumulated on the filter as an absolute value.

SUMMARY OF THE INVENTION

A primary object of this invention is to solve the above-mentioned problem, i.e., to provide a diesel particulate filter apparatus, in which a main filter for collect particulates such as carbon, soot and HC contained in the exhaust gas discharged from a diesel engine is installed in a main passage and a sub-filter is installed in the main filter; in which open-close valves are installed in the main passage and the sub-passage and a particulate accumulation sensor is installed in the exhaust gas passage on the inlet side of the main filter; and which can regenerate the main filter in response to detection values from these sensors.

Another object of this invention is to provide a diesel particulate filter apparatus, in which the particulate accumulation sensor installed in the exhaust gas passage on the inlet side of the main filter is formed of a detection filter having the same ventilation resistance as the main filter; in which the resistance of the detection filter is measured to detect the amount of accumulated particulates as an absolute value; and in which the heaters arranged on the surfaces of the filters are applied electricity in response to the detection value to incinerate collected particulates thereby regenerating the filter.

This invention is characterized in that the diesel particulate filter apparatus comprises: a main filter with a large particulate-collecting capacity and a sub-filter with a small particulate-collecting capacity, both installed in the exhaust gas passage in the diesel engine; valves to open and close passages in the main filter and the sub-filter, respectively; heaters to incinerate particulates collected in the main filter and the sub-filter; a particulate accumulation sensor to detect the amount of particulates accumulated in the main filter; and a controller to control the valves and the heaters in response to the detection signal from the particulate accumulation sensor.

The diesel particulate filter apparatus comprises: a main filter installed in an exhaust gas passage in a diesel engine; a sub-filter installed in a bypass passage in the main filter; an open-close valve for opening and closing the main passage; a bypass valve for opening and closing the bypass passage; heaters arranged on the surfaces of the main filter and the sub-filter; a particulate accumulation sensor installed in the exhaust gas passage on the inlet side of the main filter and having a detection filter; a temperature sensor for detecting the temperature of the main filter; and a controller for controlling the open-close valve, the bypass valve and the heaters in response to the detection signals from the particulate accumulation sensor and the temperature sensor for incineration of collected particulates.

The particulate accumulation sensor comprises: a detection filter whose ventilation resistance per unit volume is almost equal to that of the main filter; terminals of a conductive metal attached to the ends of the detection filter; and a resistance sensor for measuring the resistance between the terminals.

If the temperature of the main filter is high, even when the amount of collected particulates as detected by the particulate accumulation sensor is smaller than the predetermined amount, regeneration of the main filter can be started. When the temperature of the main filter is low, the filter regeneration is started only after the amount of collected particulates has become equal to or larger than the predetermined amount.

This diesel particulate filter apparatus can accurately detect the amount of particulates collected in the main filter by the particulate accumulation sensor installed in the exhaust gas passage on the inlet side of the filter and, in response to the amount of accumulated particulates, i.e., in response to detection signals from the particulate accumulation sensor and the main filter temperature sensor, apply electricity to the heaters to incinerate the particulates, thereby maintaining the main filter in a clean state at all times.

The particulate accumulation sensor detects the resistance of the detection filter to indirectly detect the amount of particulates collected in the main filter. This makes it possible to precisely and quickly detect the amount of particulates accumulated in the main filter regardless of the operating condition of the engine even when the engine load or revolution change varies the pressure of the exhaust gas. This in turn allows accurate detection of the regeneration timing of the main filter and also permits the main filter to be regenerated in a short period of time, improving the service life of the main filter and reducing the consumption of electric energy. If the detection filter is also regenerated at the same time that the filter bodies are regenerated, the exhaust gas cleaning can be performed repetitively.

Another advantage is that the optimum regeneration timing for the main filter can be detected and the frequency of use of the main filter increased to perform the cleaning of the exhaust gas in best conditions. Because the regeneration timing for the main filter can be controlled irrespective of the engine operating condition, it is possible to incinerate particulates reliably in any operation condition of the engine and to eliminate the sensors for detecting revolution and load of the engine.

Because of the construction mentioned above, the diesel particulate filter apparatus can be formed compact and simple and its function to process exhaust gas from the diesel engine is very simple and permits continuous exhaust emission control. This apparatus therefor can be mounted at locations of limited area, as in automobiles.

As to the conditions for screening the main filter, an elevated overall filter temperature has the advantages of being able to reduce the electric energy required for the heater, to detect the amount of particulates accumulated in the filter accurately and thereby incinerate the accumulated particulates at good timing, to burn particulates accumulated in the filter reliably in a short period of time and thereby increase the frequency of use of the main filter, and to incinerate particulates accumulated in the filter reliably in any operating condition of the engine. Considering these, the best timing for screening or regenerating the main filter is when the filter temperature is higher than a predetermined temperature and when the main filter is clogged with particulates and has increased resistance. When the main filter temperature is high, even if the amount of accumulated particulates as detected by the particulate accumulation sensor is lower than the predetermined amount corresponding to a withstand pressure that considers the service durability of the filter, the regeneration of the main filter is started in order to regenerate the main filter in a short period of time. When the temperature of the main filter is low, this indicates the part load operating condition. In this state, the regeneration control is performed in such a way that the regeneration is not started until the amount of accumulated particulates as detected by the particulate accumulation sensor reaches the limit, i.e., exceeds the predetermined amount.

Because the exhaust gas flows parallelly into the main filter and the detection filter in the similar conditions, the amounts of particulates collected in unit area of the main filter and of the detection filter are equal. When particulates such as carbon, soot and HC accumulate in the detection filter of the particulate accumulation sensor, carbon particles filling the gaps in the detection filter renders the filter electrically conductive, reducing the electrical resistance of the detection filter. The reduced electrical resistance is detected by the resistance sensor, allowing the amount of accumulated particulates to be determined. When the detection filter collects a predetermined amount of particulates, the filter body also collects the same predetermined amount of particulates. Hence, the heater on the filter body is turned on to incinerate the accumulated particulates thereby regenerating the filter body. At the same time, the detection filter is also applied electricity for simultaneous regeneration of the detection filter with the filter body.

The particulate accumulation sensor comprises a detection filter whose ventilation resistance per unit volume is almost equal to that of the main filter, terminals of a conductive metal attached to the ends of the detection filter, and a sensor for measuring the resistance between the terminals.

Further, the detection filter is made of a ceramics porous material of SiC or SiC containing Ti or Ta additive, with the terminal portions impregnated with a metal such as Cu, Cr and Ni.

Alternatively, the detection filter is constructed of a fiber-laminated material of long ceramics fibers of SiC or SiC containing Ti or Ta and a metal mesh formed of conductive heat-resistant steel wires stacked on the surface of the fiber-laminated material. The wire rods of the mesh are partly cut off between the terminals.

The detection filter is made of conductive SiC fibers or porous material and has a sensor for measuring resistance installed at each end. Either the filter body or bellows-like filter is formed into cylindrical shape, which is fitted on its surface with the mesh that forms a heater.

Where the mesh of conductive, heat-resistant steel wire rods, which are partly cut off, is put on the surface of the detection filter, when carbon particles accumulate at the cut portions of the wire rods, the resistance of the detection filter reduces, permitting the amount of particulates collected in the detection filter to be determined. In the detection filter formed of ceramics porous material, carbon particles or other particulates accumulate in the pores reducing the electric resistance of the detection filter, which in turn allows the amount of accumulated particulates in the detection filter to be determined.

Because the filter body is formed of a main filter and a sub-filter and the metal meshes forming the heaters are located on the exhaust gas inlet side, the main filter can be regenerated by closing the open-close valve and opening the bypass valve to pass a small amount of exhaust gas to the main filter and by applying electricity to the metal meshes. With this operation, it is possible to supply oxygen for incinerating the particulates collected in the main filter. When the bypass valve is closed to supply the exhaust gas to the main filter, the exhaust gas leaking through the bypass valve flows through the sub-filter. Particulates that were collected by the sub-filter when the main filter was regenerated are therefore supplied to the sub-filter. Furthermore, because the sub-filter is installed inside the main filter, the overall filter structure is compact and the sub-filter is prevented from cooling by the main filter arranged on the outer side of the sub-filter. Therefore, the sub-filter is heated by applying electricity to the metal net attached to the sub-filter to incinerate the particulates collected in the sub-filter with oxygen contained in the leaking exhaust gas.

DETAILED DESCRIPTION OF EMBODIMENT

By referring to the accompanying drawings, an embodiment of the diesel particulate filter apparatus (hereinafter referred to as a DPF apparatus) of this invention is described.

Figure 1:
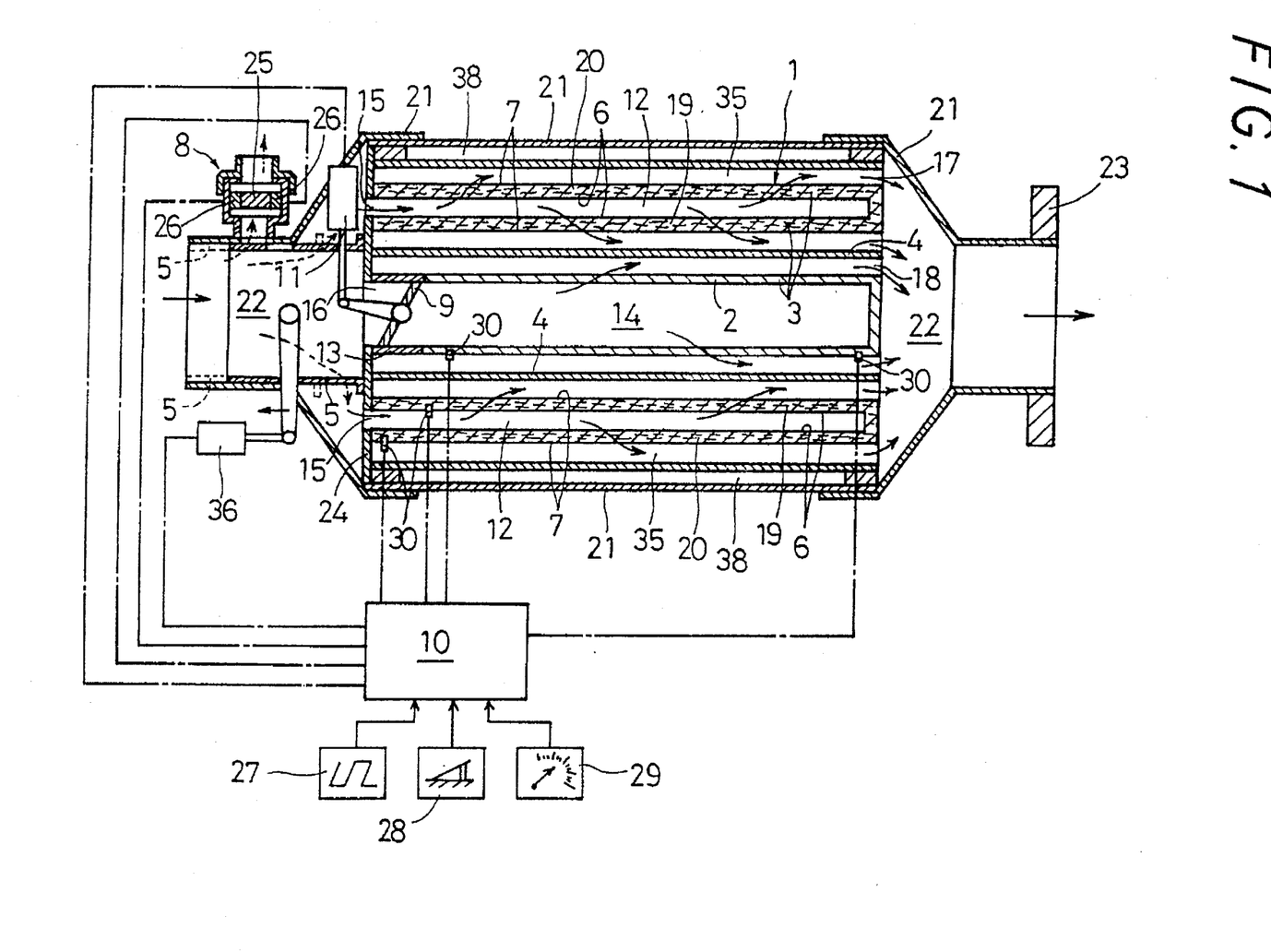
FIG. 1 is a cross section of the diesel particulate filter apparatus as one embodiment of this invention.

This DEF apparatus is provided in an exhaust system for a diesel engine, and can collect the particulates, such as carbon, soot and smoke contained in an exhaust gas and incinerate the collected particulates. This DPE apparatus has a case 21 connected to an exhaust pipe (not shown) of a diesel engine via flanges 23. In an exhaust gas passage 22 formed in the case 21, a main filter 1 and a sub-filter 2 which are capable of collecting particulates are provided so as to be separated from each other by a bypass cylinder 4 in the direction of a flow of an exhaust gas and extend concentrically in parallel with the flow of the exhaust gas from an inlet side to an outlet side. The main filter 1 comprises an inner and outer cylinders 19, 20, i.e. cylindrical members extending concentrically with and in parallel with a flow of exhaust gas and in two layers. The inner wall surface of the case 21 may be formed with a heat shielding layer 38.

At the exhaust gas inlet and outlet sides of the exhaust gas passage 22, shielding plates 24 are provided which close the inlet and outlet sides of the exhaust gas passage 22 except inlets 15, 16 of the main filter 1 and sub-filter 2 and outlets 17, 18 thereof. Installed upstream of an exhaust gas inlet of the main filter 1 is a cylindrical open-close valve 5 that can be slid to open or close a main exhaust gas passage 12. The open-close valve 5 is operated by an actuator 36 driven by a command from a controller 10. A support pipe 13 is joined to an exhaust gas introducing side of the sub-filter 2, and a bypass valve 9 for opening and closing an admission port of the sub-filter 2 is provided in the support pipe 13. The bypass valve 9 is opened and closed by an actuator 11 which is driven by a command from a controller 10. The open-close valve 5 and bypass valve 9 may be provided with through bores from which a small amount of exhaust gas leaks for the regeneration of the main filer 1 and the sub-filter 2, or they may be installed in the exhaust gas passage 22 and the bypass passage 14 in such a way as to leak the gas.

In this DPF apparatus, the main filter 1 and the sub-filter 2 are constructed of a filter body 3, whose inner and outer surfaces are fitted, at least on the exhaust gas inlet side, with metal meshes 6, 7 formed of conductive material. The filter body 3 is a plate shaped into a cylinder, which is made of laminated long ceramics fibers of SiC or SiC containing additives such as Ti and Ta. When an exhaust gas is passed through the filter body 3, the particulates in the exhaust gas are collected in crossing areas between fibers. As the particulates accumulate between fibers, the exhaust gas pressure upstream of the filter body 3 increases.

The metal net 6 is provided on the upstream side portion with respect to a flow of exhaust gas of the main filter 1, and the metal net 7 on the downstream side portion with respect thereto of the main filter 1. The metal nets 6, 7 are formed out of heat resisting steel having a corrosion resistance and containing Ni, Cr and Al, and they are provided on the outer surfaces of the filter bodies 3 and can be fixed to the main filter 1 suitably by staplers. When the main filter is formed by two cylindrical filters, i.e. inner and outer filters 19, 20, a main exhaust gas introducing passage 12 positioned on the exhaust gas introducing side is formed between the inner and outer cylinders 19, 20, and main exhaust gas discharging passages 35 positioned on the exhaust gas discharging side and adapted to discharge the exhaust gas passed through the main filter 1 are formed on the inner side of the inner cylinder 13 and on the outer side of the outer cylinder 20. More detailed explanation is given to the outer cylinder 20 for example. The nets 6, 7 are secured to the inner and outer surfaces of the outer cylinder 20 by stapler. The net 6 arranged on the inner surface of the outer cylinder 20, i.e., on the inflow side of the exhaust gas, is formed of a conductive material and provided with a terminal 30 so that the net 6 can function as a heater. The net 7 arranged on the outer surface of the outer cylinder 20, i.e., on the outflow side of the exhaust gas, need not be formed of a conductive material. The nets 6, 7 have a function of holding the filter body 3.

Application of electricity to the net 6 is controlled by the commands from the controller 10 to incinerate particulates collected by the main filter 1. The sub-filter 2, though not shown, is provided with a net similar to the ones attached to the main filter 1 to incinerate particulates collected in the sub-filter 2. The nets 6, 7 extend over the entire surface, on the upstream side, of the main filter 1 in the exhaust gas passage 22 and over the entire surface, on the upstream side, of the sub-filter 2 in the bypass passage 14, and are connected through electrode terminals 30 to the controller 10. It is preferred that the net 6 be formed of Ni-based metal to allow uniform heating of the surface of the main filter 1.

Figure 5:
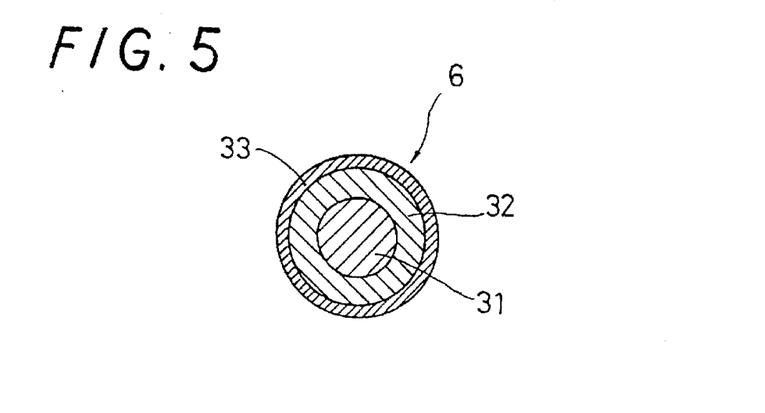
FIG. 5 is an enlarged cross section showing one embodiment of a wire rod of a mesh forming a heater in the diesel particulate filter of FIG. 1.

The mesh 6 is formed of a wire rod that consists, as shown in FIG. 5, of a core member 31 of N—Cr alloy, an intermediate member 32 of a material with a large resistance temperature coefficient, such as Ni, coating the core member 31, and a layer of coating 33 of corrosion resisting $Al_2O_3$ or $ZrO_2$ coating the intermediate member 32.

This DPF apparatus has a particulate accumulation sensor 8 installed on the inlet side of the exhaust gas passage 22. The particulate accumulation sensor 8 consists, as shown in FIG. 2 or 3, of a sensing filter 25 whose ventilation resistance per unit volume is almost equal to that of the filter body 3, terminals 26 of conductive metal attached to the ends of the sensing filter 25, and a resistance sensor (not shown) provided in the controller 10 to measure the resistance between the terminals 26.

Figure 2:
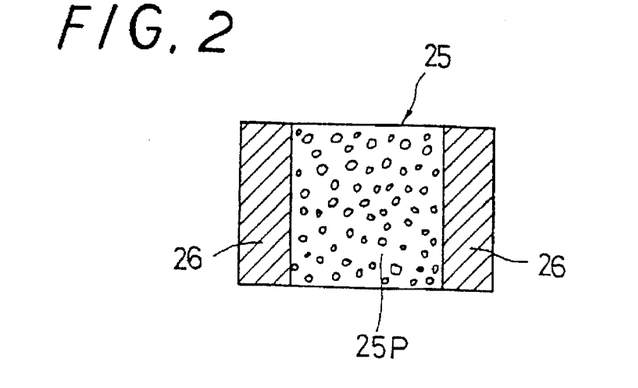
FIG. 2 is a plan view showing an embodiment of a particulate accumulation sensor of FIG. 1.

The sensing filter 25, as shown in FIG. 2, is formed of a laminated ceramics porous material 25P of SiC or of SiC containing additives such as Ti or Ta. The terminal portions of the sensing filter 25 are impregnated with metals such as Cu, Cr and Ni.

Figure 3:
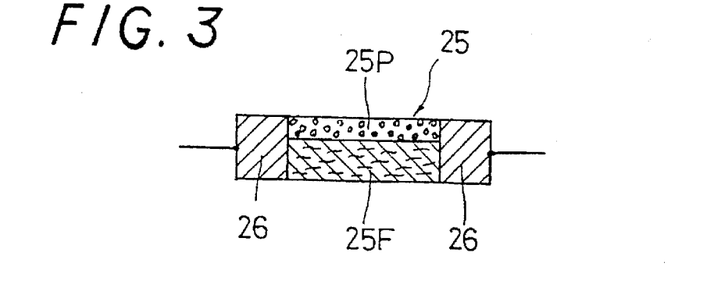
FIG. 3 is a cross section of another example of a detection filter in the particulate accumulation sensor of FIG. 1.
Figure 4:
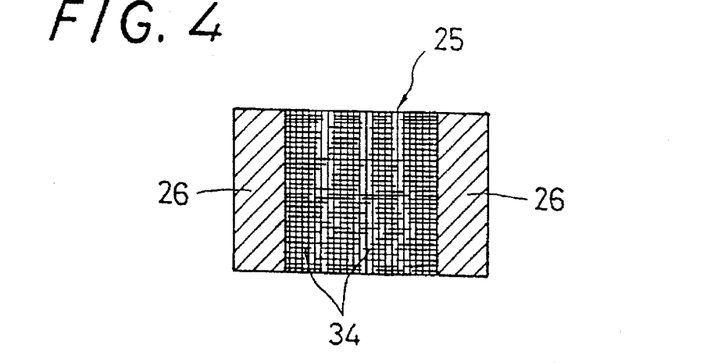
FIG. 4 is a plan view showing another embodiment of the particulate accumulation sensor of FIG. 1.

Alternatively, the sensing filter 25, as shown in FIG. 3, may be formed of two layers stacked together—a ceramics long fiber layer 25F of SiC or SiC containing Ti or Ta and a ceramics porous material 25P. The ceramics porous material 25P of the sensing filter 25 is either conductive or nonconductive and has a characteristic that when its pores are clogged with carbon and particulates, the ceramics porous material 25P becomes conductive reducing the electric resistance. The junction ends of the sensing filter 25 with the terminals 26 are impregnated with a metal such as Cu, Cr and Ni to ensure good electrical connection between the sensing filter 25 and the connector of the terminals 26. Further, over the surface of the sensing filter 25 is placed a net 34 of heat resistant steel that can conduct electricity and whose wire rods are partly cut between the terminals 26, as shown in FIG. 4. Hence, when carbon and particulates accumulate and clog the cut portions of the net 34, its electric resistance becomes small. The sensing filter 25 may also be formed of conductive SiC fibers attached with terminals 26 at the ends. This construction obviates the need for using the net.

Information on the amount of accumulated particulates detected by the particulate accumulation sensor 8 is fed to the controller 10. The controller 10 has a revolution sensor 27 to detect the engine running condition, i.e., the revolution speed of the engine, a load sensor 28 to detect the load of the engine, and a temperature sensor 29 to detect the exhaust gas temperature. The controller 10 receives these detection signals representing the condition of the engine, determines the particulate collection state that corresponds to the detected particulate accumulation value representing the engine running condition and thereby controls the opening timing of the open-close valve 5 and the bypass valve 9, i.e., the regeneration timing for the main filter 1.

Figure 6:
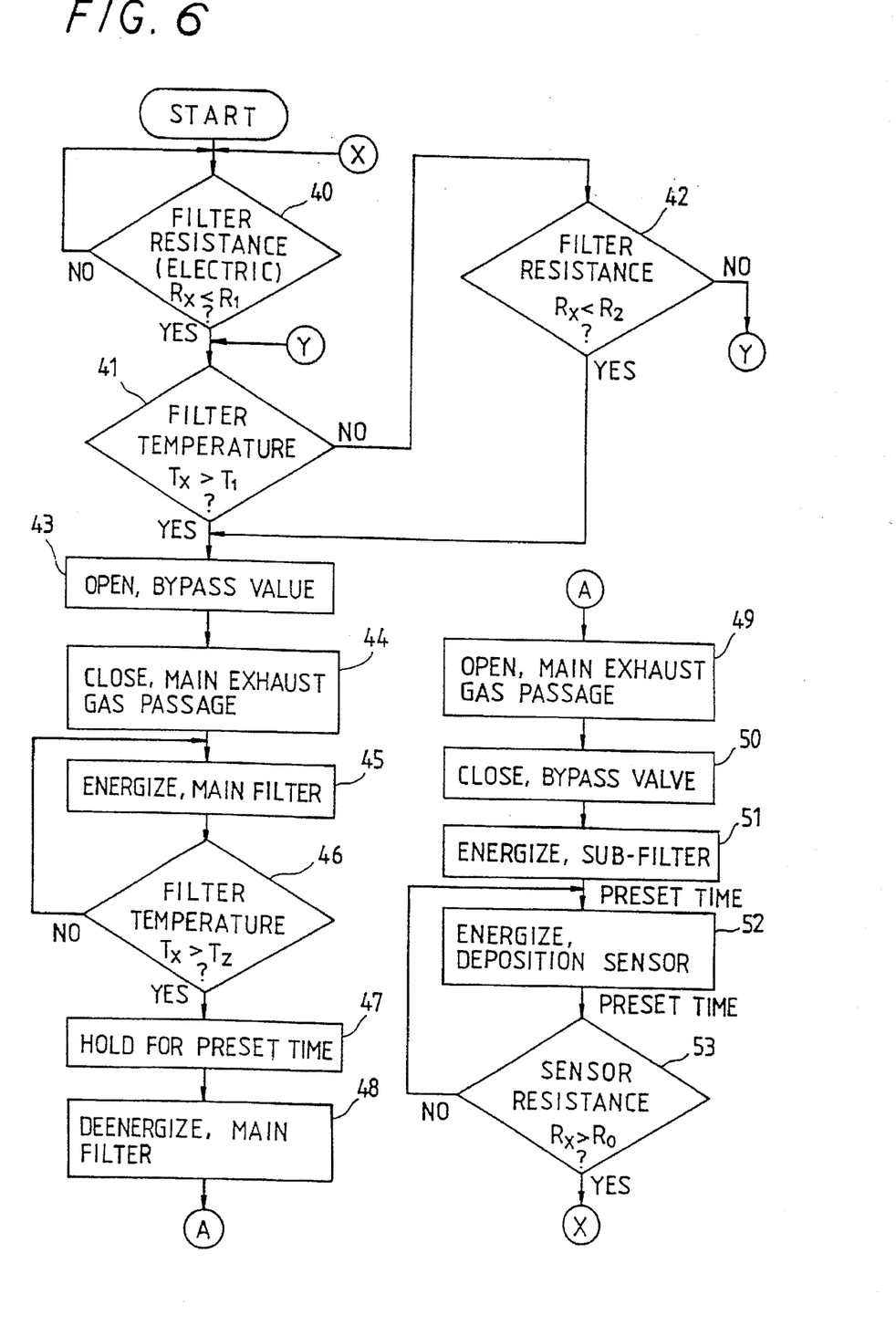
FIG. 6 is a processing flow chart showing the operation of the diesel particulate filter apparatus of FIG. 1.

Next, the operation of the DPF apparatus is explained by referring to the control flow diagram of FIG. 6. As the diesel engine is started, the exhaust gas is supplied through the exhaust pipe to the exhaust gas passage 22. At this time, the open-close valve 5 is opened and the bypass valve 9 closed. The exhaust gas is fed from the inlet 15 of the exhaust gas passage 22 into the main exhaust gas passage 12, from which it passes through the main filter 1 that collects particulates such as soot, carbon and smoke contained in the exhaust gas, allowing the clean gas to flow toward the outlet 17. The collected particulates are accumulated on the main filter 1 and the air passage resistance of the main filter 1 progressively increases with the lapse of collection time. The exhaust gas also flows through the particulate accumulation sensor 8 that collects particulates contained in the exhaust gas with the sensing filter 25. The controller 10 receives detection signals from the particulate accumulation sensor 8, revolution sensor 27, load sensor 28 and temperature sensor 29, and estimates the amount of accumulated particulates in the main filter 1.

To detect the accumulated amount of particulates in the sensing filter 25, electric current is applied to the sensing filter 25 to measure the resistance Rx of the filter 25, which is sent to the controller 10 that checks whether the resistance Rx is lower than a preset resistance $R_1$ ($R_1$>Rx) (step 40).

If the detected resistance Rx is higher than the preset resistance $R_1$, it is decided that the main filter 1 is not deposited with a sufficient amount of particulates and that the resistance of the main filter 1 is still high and regeneration of the main filter 1 is not necessary. So, the processing returns to the initial step.

When the detected resistance Rx is lower than the preset resistance $R_1$, this indicates that the main filter 1 is deposited with a certain amount of particulates. The controller 10 then checks whether the temperature Tx of the main filter 1 is higher than the preset temperature $T_1$ (step 41).

If the temperature Tx of the main filter 1 is lower than the preset temperature $T_1$, it is necessary to feed a large amount of electric power to the net 6 of the heater to heat the particulates collected in the main filter 1, so that the main filter 1 is not regenerated and continues to collect particulates until the limit of particulate accumulation amount is reached.

Then it is checked whether the resistance Rx of the sensing filter 25 is smaller than the preset limit resistance value $R_2$ (step 42). When the resistance Rx is smaller than the preset limit resistance value $R_2$, it is decided that the main filter 1 has collected particulates in an amount reaching the limit, so that the processing moves to regeneration of the main filter 1. When the resistance Rx is greater than the preset resistance value $R_2$, it is decided that the main filter 1 has not yet collected particulates in an amount reaching the limit, so that the main filter 1 continues to collect particulates and the processing returns to step 41 without regenerating the main filter 1. The resistance value of the main filter 1 is inversely proportional to the accumulated amount of particulates.

When at an elevated temperature Tx the main filter 1 is to be regenerated, it is not necessary to supply so much of electric power to the net 6 of the heater to incinerate the particulates collected in the main filter 1 and the main filter 1 can be regenerated in a short period of time. The regeneration of the main filter 1 therefore is immediately started. Even when the temperature Tx of the main filter 1 is low, if the resistance Rx of the main filter 1 is lower than the preset limit resistance value $R_2$, it is decided that the main filter 1 has already collected particulates to the limit. In this case, too, the main filter 1 is regenerated.

The controller 10 performs a control to drive the actuator 11 to open the bypass valve 9 (step 43) and at the same time to drive the actuator 36 to close the open-close valve 5 and thereby close the main exhaust gas passage (step 44). When the bypass valve 9 is open, a major part of the exhaust gas passes through the bypass passage 14 and the sub-filter 2, with only a small amount of the exhaust gas supplied from the exhaust gas passage 22 to the main filter 1. Further, the controller 10 issues a command that causes current to be applied through the electrode terminals 30 to the net 6, heating the net 6 and therefore the main filter 1 (step 45). The temperature Tx of the main filter 1 is measured by the temperature sensor 29, and the controller 10 checks if the temperature Tx is higher than the preset temperature $T_2$ (step 46). When the detected temperature Tx is lower than the preset temperature $T_2$, it is decided that the collected particulates are not completely incinerated. The processing therefore returns to step 45 to continue applying electricity to the mesh 6 of the heater.

When the detected temperature Tx becomes higher than the preset temperature $T_2$, the particulates in the main filter 1 are incinerated well. This state therefore is maintained for a specified duration of time (step 47). As the main filter 1 is heated, the particulates collected in the main filter 1 are turned into $CO_2$ and $H_2O$ and incinerated by using air contained in the small amount of exhaust gas passing through the main filter 1, and then the produced gas is released from the outlet 17, thus completing the regeneration of the main filter 1. After the main filter 1 has been regenerated for a specified duration, the current application to the net 6 of the main filter 1 is stopped (step 48). The completion of regeneration of the main filter 1 is decided by the controller 10 based on the duration and considering the amount of accumulated particulates and the engine running condition.

The exhaust gas passing through the sub-filter 2 are removed of particulates contained therein by the sub-filter 2. The particulates thus collected accumulate in the sub-filter 2. The regeneration of the sensing filter 25 may be performed simultaneously with the regeneration of the main filter 1 by applying electricity also to the sensing filter 25, or may be performed in step 52 following the regeneration of the sub-filter 2. The regeneration of the sensing filter 25 is repeated until the resistance Rx of the sensing filter 25 is greater than the initial resistance $R_0$ (step 53). Alternatively, in a structure where a metal net 34 of conductive heat resistant steel is placed over the surface of the sensing filter 25 and the wire rods of the metal mesh 34 are partly cut between the terminals 26, carbon particles when collected and deposited on the cut portions of the wire rods reduce the resistance of the net 34, making it possible to screen or regenerate the sensing filter 25 by applying electricity to the net 34.

When the main filter 1 is completely regenerated, the controller 10 activates the actuator 36 to open the open-close valve 5 and therefore the main exhaust gas passage 12 (step 49). At the same time, the controller 10 issues a command to drive the actuator 11 to close the bypass valve 9 and therefore the bypass passage 14 (step 50). When the open-close valve 5 is open and the bypass valve 9 is closed, the exhaust gas flows from the exhaust gas passage 22 through the main filter 1, initiating the normal exhaust gas processing, i.e., the particulate collecting by the main filter 1. At this time, a very small amount of exhaust gas passes through a through bore or gap formed in the bypass valve 9 into the bypass passage 14. Then, the heater of the sub-filter 2 is turned on to incinerate the particulates collected in the sub-filter 2 by using air contained in the small amount of exhaust gas passing through the sub-filter 2, thus regenerating the sub-filter 2 (step 51). This diesel particulate filter repeats the above operation cycle to clean the exhaust gas continuously.

What is claimed is:

1. A diesel particulate filter apparatus comprising:

a main filter with a large particulate-collecting capacity installed in an exhaust gas passage in a diesel engine;

a sub-filter with a small particulate-collecting capacity arranged in parallel with the main filter and installed in the exhaust gas passage;

a valve to control an exhaust gas flow to the main filter and a valve to control an exhaust gas flow to the sub-filter;

heaters provided to the main filter and the sub-filter to burn particulates collected in the main filter and the sub-filter;

a particulate accumulation sensor to detect the amount of particulates accumulated in the main filter; and a controller to control the valves and the heaters in response to a detection signal from the particulate accumulation sensor.

2. A diesel particulate filter apparatus according to claim 1, wherein filter bodies forming the main filter and the sub-filter each comprise long ceramics fibers laminated at random.

3. A diesel particulate filter apparatus according to claim 1, wherein the sub-filter is installed in a bypass passage formed in the main filter, and the valves are formed of an open-close valve that opens and closes the main passage for the main filter and a bypass valve that opens and closes the bypass passage.

4. A diesel particulate filter apparatus according to claim 1, wherein the heaters are each installed on the surfaces of the main filter and the sub-filter.

5. A diesel particulate filter apparatus according to claim 1, wherein the particulate accumulation sensor is installed in the exhaust gas passage for the main filter on the exhaust gas inlet side.

6. A diesel particulate filter apparatus according to claim 3, wherein the controller controls the open-close valve, the bypass valve and the heaters in response to detection signals from a temperature sensor for detecting the temperature of the main filter and from the particulate accumulation sensor to incinerate collected particulates.

7. A diesel particulate filter apparatus according to claim 1, wherein the particulate accumulation sensor comprises a detection filter having almost the same ventilation resistance per unit volume and structure as the main filter, terminals of a conductive metal attached to ends of the detection filter, and a resistance sensor for measuring the resistance between the terminals.

8. A diesel particulate filter apparatus according to claim 7, wherein the detection filter formed of ceramics porous material comprising SiC or SiC containing an additive, such as Ti and Ta, and the terminal portions of the detection filter are impregnated with a metal such as Cu, Cr and Ni.

9. A diesel particulate filter apparatus according to claim 7, wherein the detection filter comprises a fiber-laminated material having long fibers of SiC or SiC containing Ti and Ta laminated at random and a metal net made of conductive heat-resistant steel and stacked on the surface of the fiber-laminated material with the wire rods of the metal net partly cut between the terminals.

10. A diesel particulate filter apparatus according to claim 7, wherein the detection filter is made of conductive SiC fibers, has the metal net so formed that the wire rod density of the net increases toward the ends, and has, the sensors at the ends of the net for measuring the net resistance.

11. A diesel particulate filter apparatus according to claim 1, wherein if the temperature of the main filter is high, regeneration of the main filter is started even when the amount of accumulated particulates as detected by the particulate accumulation sensor is smaller than a predetermined amount.

12. A diesel particulate filter apparatus according to claim 1, wherein if the temperature of the main filter is low, regeneration of the main filter is started only when the amount of accumulated particulates as detected by the particulate accumulation sensor is equal to or larger than a predetermined amount.

13. A diesel particulate filter apparatus according to claim 1, wherein the main filter and the sub-filter are made, of a cylindrical filter or a bellows-like cylindrical filter, with a metal net which forms a heater arranged on the surface of each of the filter bodies.

* * * * *